US009989718B2

(12) United States Patent
Kurashima et al.

(10) Patent No.: US 9,989,718 B2
(45) Date of Patent: Jun. 5, 2018

(54) OPTICAL MODULE WITH ELECTROMAGNETIC ABSORPTION

(71) Applicants: FUJITSU COMPONENT LIMITED, Tokyo (JP); FUJITSU LIMITED, Kawasaki-shi, Kanagawa (JP)

(72) Inventors: Shigemi Kurashima, Tokyo (JP); Mitsuki Kanda, Tokyo (JP); Shinichiro Akieda, Tokyo (JP); Takatoshi Yagisawa, Kawasaki (JP)

(73) Assignees: FUJITSU COMPONENT LIMITED, Tokyo (JP); FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/652,426

(22) Filed: Jul. 18, 2017

(65) Prior Publication Data

US 2018/0031789 A1 Feb. 1, 2018

(30) Foreign Application Priority Data

Jul. 27, 2016 (JP) ................................ 2016-147294

(51) Int. Cl.
*G02B 6/42* (2006.01)
*G02B 6/38* (2006.01)

(52) U.S. Cl.
CPC ......... *G02B 6/4277* (2013.01); *G02B 6/3887* (2013.01); *G02B 6/428* (2013.01); *G02B 6/4284* (2013.01); *G02B 6/4292* (2013.01)

(58) Field of Classification Search
None
See application file for complete search history.

(56) References Cited

U.S. PATENT DOCUMENTS

| | | | | |
|---|---|---|---|---|
| 5,349,437 | A * | 9/1994 | Bobb | G01J 5/58 250/227.27 |
| 8,313,251 | B2 | 11/2012 | Maeda et al. | |
| 8,491,316 | B2 * | 7/2013 | Ikeuchi | H01R 12/62 439/79 |
| 8,655,119 | B2 * | 2/2014 | Yagisawa | G02B 6/4201 385/14 |
| 8,714,840 | B2 | 5/2014 | Matsue et al. | |
| 8,721,349 | B2 * | 5/2014 | Yagisawa | G02B 6/4246 439/67 |

(Continued)

FOREIGN PATENT DOCUMENTS

| | | |
|---|---|---|
| JP | 2009-258463 | 11/2009 |
| JP | 2013-029639 | 2/2013 |
| JP | 2013-069883 | 4/2013 |

*Primary Examiner* — Andrew Jordan
(74) *Attorney, Agent, or Firm* — IPUSA, PLLC

(57) ABSTRACT

An optical module includes a board; a photoelectric transducer disposed on the board; an optical waveguide that is connected to the board and transmits light entering or emitted from the photoelectric transducer; an optical connector including a first end connected to the optical waveguide and a second end to be connected to an optical cable; a housing that houses the board, the photoelectric transducer, the optical waveguide, and the optical connector; and a conductive part that is provided between the optical waveguide and the housing, in contact with the housing, and formed of an elastic conductive material or a radio absorbing material.

9 Claims, 21 Drawing Sheets

(56) References Cited

U.S. PATENT DOCUMENTS

| | | | | |
|---|---|---|---|---|
| 9,025,914 | B2 * | 5/2015 | Yagisawa | G02B 6/4246<br>385/14 |
| 9,054,812 | B2 * | 6/2015 | Yagisawa | G02B 6/4246 |
| 9,453,975 | B2 * | 9/2016 | Akieda | G02B 6/3879 |
| 9,625,663 | B2 * | 4/2017 | Akabane | G02B 6/423 |
| 9,690,059 | B2 * | 6/2017 | Akieda | G02B 6/4245 |
| 9,798,097 | B2 * | 10/2017 | Yagisawa | G02B 6/424 |
| 9,857,546 | B2 * | 1/2018 | Zhang | G02B 6/4292 |
| 2012/0063785 | A1 * | 3/2012 | Yagisawa | G02B 6/4246<br>398/116 |
| 2014/0178079 | A1 * | 6/2014 | Yagisawa | G02B 6/4246<br>398/139 |
| 2014/0193160 | A1 * | 7/2014 | Yagisawa | G02B 6/4246<br>398/136 |
| 2016/0091670 | A1 * | 3/2016 | Akieda | G02B 6/3879<br>385/78 |
| 2016/0259137 | A1 * | 9/2016 | Akabane | G02B 6/4292 |
| 2016/0356973 | A1 * | 12/2016 | Zhang | G02B 6/4292 |
| 2017/0003464 | A1 * | 1/2017 | Akieda | G02B 6/4245 |
| 2017/0075107 | A1 * | 3/2017 | Kumagai | G02B 26/08 |
| 2017/0082810 | A1 * | 3/2017 | Daikuhara | G02B 6/4224 |
| 2017/0090125 | A1 * | 3/2017 | Kurashima | G02B 6/327 |
| 2017/0097476 | A1 * | 4/2017 | Yagisawa | G02B 6/424 |
| 2017/0176695 | A1 * | 6/2017 | Akabane | G02B 6/3887 |
| 2018/0011264 | A1 * | 1/2018 | Uchiyama | G02B 6/4206 |
| 2018/0031789 | A1 * | 2/2018 | Kurashima | G02B 6/4277 |

* cited by examiner 81
82
83
17
10
15
11
12
52
13
20
51
A
30
B
72
71
60
ELECTRIC SIGNAL
OPTICAL SIGNAL

OPTICAL MODULE WITH ELECTROMAGNETIC ABSORPTION

CROSS-REFERENCE TO RELATED APPLICATION

The present application is based upon and claims the benefit of priority of Japanese Patent Application No. 2016-147294, filed on Jul. 27, 2016, the entire contents of which are incorporated herein by reference.

BACKGROUND OF THE INVENTION

1. Field of the Invention

An aspect of this disclosure relates to an optical module.

2. Description of the Related Art

Electric cables made of, for example, copper have been used for communications performed by supercomputers and high-end servers via high-speed interfaces. However, optical communication is becoming popular to achieve high-speed signal transmission and to increase the transmission distance.

Next generation interfaces with a long transmission distance of tens of meters employ optical communication technologies, and use optical modules to connect optical cables to, for example, servers and convert electric signals into optical signals. An optical module converts an optical signal from an optical cable into an electric signal, outputs the electric signal to a server, converts an electric signal from the server into an optical signal, and outputs the optical signal to the optical cable.

An optical module includes, in a housing, a light-emitting element for converting an electric signal into an optical signal, a light-receiving element for converting an optical signal into an electric signal, a driving integrated circuit (IC) for driving the light-emitting element, and a trans-impedance amplifier (TIA) for converting an electric current into a voltage. The light-emitting element, the light-receiving element, the driving IC, and the TIA are mounted on a substrate. The light-emitting element and the light-receiving element are connected to a ferrule such as a lens ferrule via an optical waveguide (see, for example, Japanese Laid-Open Patent Publication No. 2013-69883, Japanese Laid-Open Patent Publication No. 2013-29639, and Japanese Laid-Open Patent Publication No. 2009-258463).

When an optical module using a high-frequency electric signal is actuated, an electromagnetic wave may be generated as noise. Such an electromagnetic wave may cause undesirable effects on, for example, an electronic apparatus located near the optical module.

SUMMARY OF THE INVENTION

In an aspect of this disclosure, there is provided an optical module including a board; a photoelectric transducer disposed on the board; an optical waveguide that is connected to the board and transmits light entering or emitted from the photoelectric transducer; an optical connector including a first end connected to the optical waveguide and a second end to be connected to an optical cable; a housing that houses the board, the photoelectric transducer, the optical waveguide, and the optical connector; and a conductive part that is provided between the optical waveguide and the housing, in contact with the housing, and formed of an elastic conductive material or a radio absorbing material.

BRIEF DESCRIPTION OF THE DRAWINGS

FIG. 4 is a graph illustrating frequency characteristics observed while an optical module is powered on;

FIG. 7 is a graph illustrating frequency characteristics observed while the optical module of the first embodiment is powered on;

FIG. 21 is a graph illustrating frequency characteristics observed while an optical module including no conductive part is powered on;

FIG. 22 is a graph illustrating frequency characteristics observed while the optical module of the fourth embodiment is powered on.

DESCRIPTION OF EMBODIMENTS

Embodiments of the present invention are described below with reference to the accompanying drawings. The same reference number is assigned to the same component, and repeated descriptions of the same component are omitted.

Figure 1:
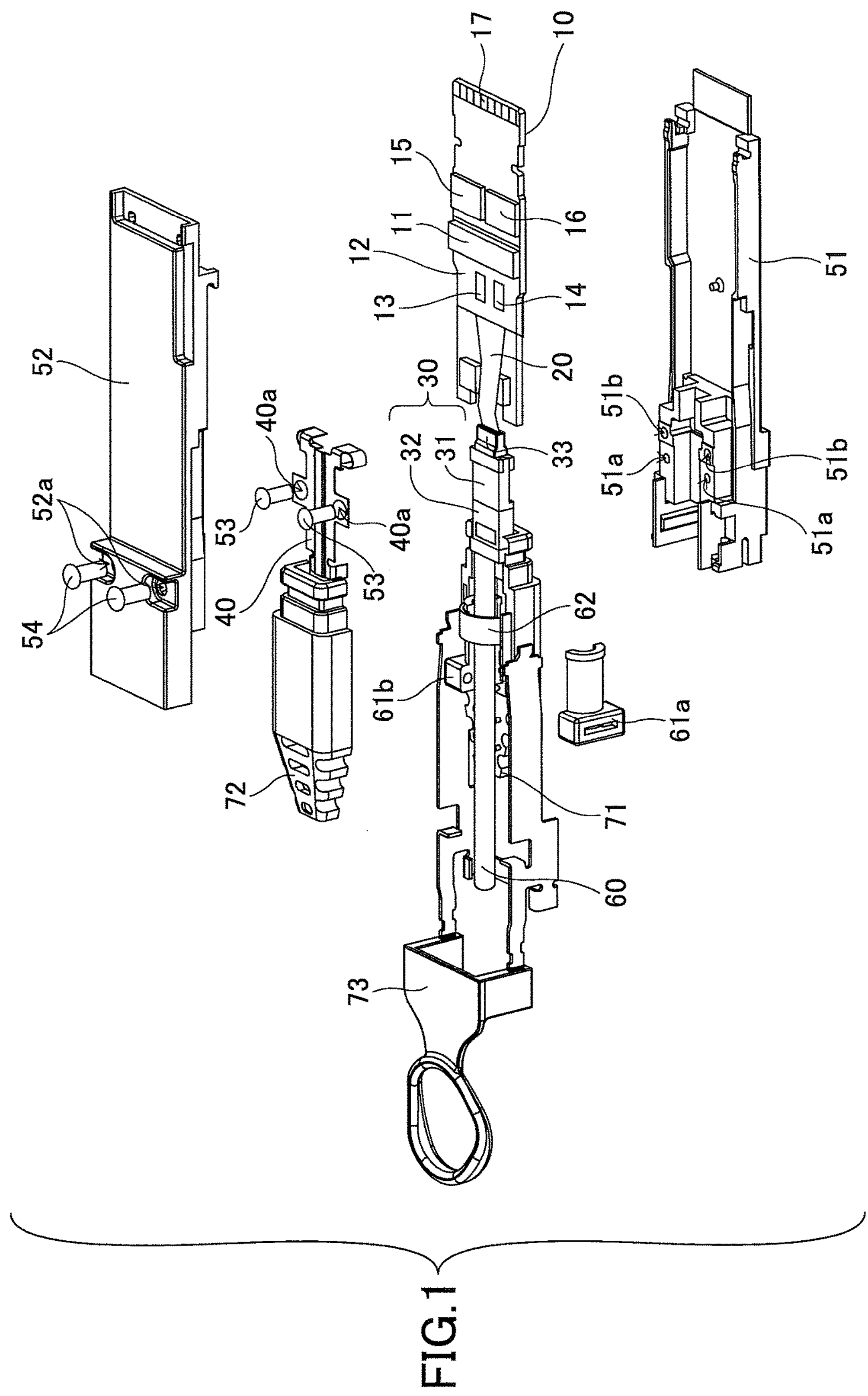
FIG. 1 is an exploded perspective view of an optical module.

Electromagnetic waves generated in an optical module are described with reference to FIG. 1. FIG. 1 is an exploded perspective view of an optical module.

The optical module of FIG. 1 includes a circuit board (board) 10, an optical waveguide 20, an optical connector 30, and a clip 40 that are housed in a housing formed by a lower housing 51 and an upper housing 52. An optical cable 60 is connected to the optical module. A part of the optical cable 60 is covered by the housing.

The board 10 includes a flexible printed-circuit (FPC) connector 11 to which an FPC 12 is connected. The FPC 12 includes a light-emitting element 13 such as a vertical cavity surface emitting laser (VCSEL) that converts an electric signal into an optical signal and emits the optical signal, and a light-receiving element 14 such as a photodiode that converts an optical signal into an electric signal. The board 10 also includes a driving integrated circuit (IC) 15 for driving the light-emitting element 13, a trans-impedance amplifier (TIA) 16 for converting an electric current output from the light-receiving element 14 into a voltage, and a terminal 17 for connecting the optical module to an external apparatus. The light-emitting element 13 and the light-receiving element 14 may be collectively referred to as a "photoelectric transducer".

The optical waveguide 20 is formed like a flexible sheet, and includes multiple cores surrounded by clads. Light entering the optical waveguide 20 propagates through the cores.

The optical connector 30 includes a lens ferrule 31 and an MT ferrule 32 that are connected to each other and held together by the clip 40.

The optical waveguide 20 is connected to the lens ferrule 31, and the junction between the optical waveguide 20 and the lens ferrule 31 is protected by a ferrule boot 33. Screw holes 40*a* formed in the clip 40 are aligned with screw holes 51*a* of the lower housing 51, and the clip 40 is screwed to the lower housing 51 with screws 53. With the clip 40 screwed to the lower housing 51, the optical connector 30 is fixed to the lower housing 51.

Sleeves 61*a* and 61*b* are fixed by a crimp ring 62 to the optical cable 60. A portion of the optical cable 60 to which the sleeves 61*a* and 61*b* are attached is covered by upper and lower cable boots 71 and 72, and a pull-tab/latch part 73 is attached to the cable boots 71 and 72.

The optical connector 30 is fixed via the clip 40 to the lower housing 51, the upper housing 52 is placed on the lower housing 51 on which the board 10 is placed, and screws 54 are screwed into screw holes 52*a* of the upper housing 52 and screw holes 51*b* of the lower housing 51 to fix the upper housing 52 to the lower housing 51.

Figure 2:
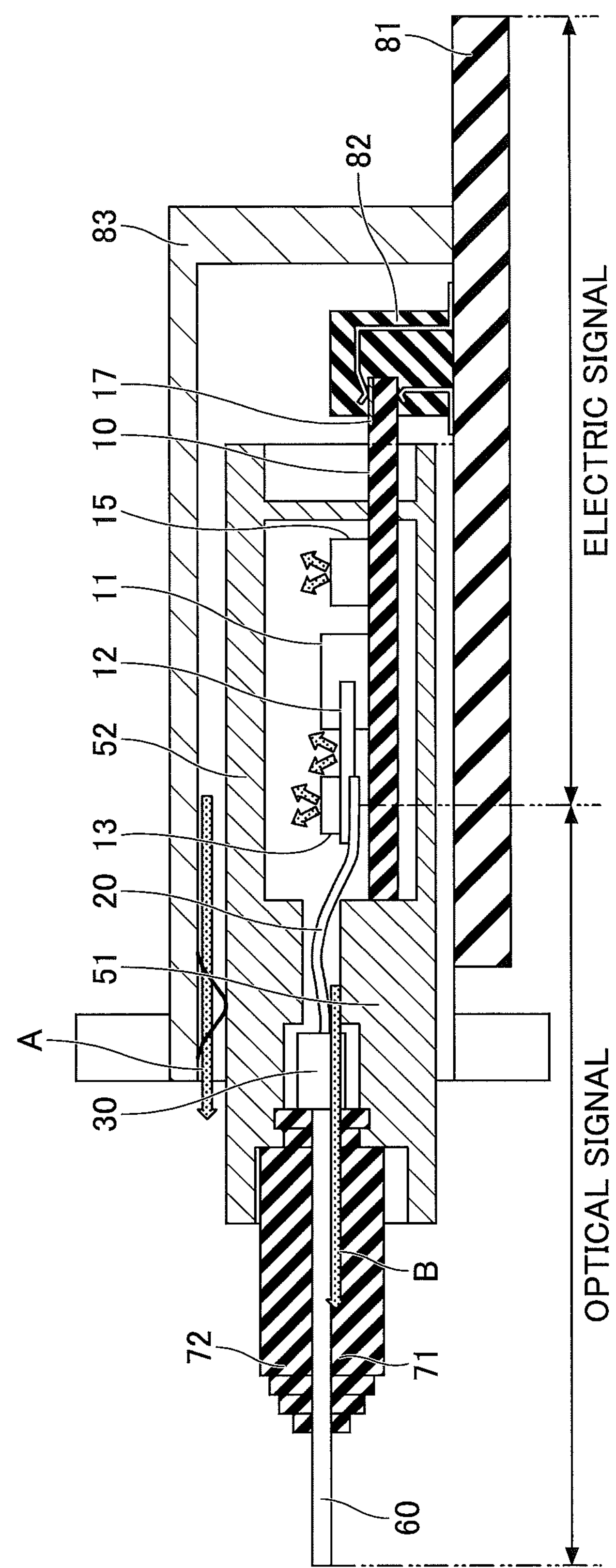
FIG. 2 is a drawing illustrating a configuration of an optical module.

As illustrated in FIG. 2, the terminal 17 of the board 10 is inserted into a connector 82 of a board 81 of an external apparatus, and the optical module is thereby connected to the connector 82. A cage 83 is provided to cover the optical module connected to the connector 82. The lower housing 51, the upper housing 52, and the cage 83 are formed of a metal.

The cage 83 blocks electromagnetic waves generated when the optical module is actuated. However, even with the cage 83, electromagnetic waves leak out of the optical module and the cage 83.

Through a research, the inventors have found out that electromagnetic waves (which may be hereafter referred to as "noise electromagnetic waves") that become noise are generated by wires (not shown) formed on the board 10 and the FPC 12, the light-emitting element 13, and the driving IC 15 in the housing of the optical module. The inventors have also found out that there is an electromagnetic wave (which is hereafter referred to as an "electromagnetic wave A") that leaks, as indicated by an arrow A, through a gap between the upper housing 52 and the cage 83, and an electromagnetic wave (which is hereafter referred to as an "electromagnetic wave B") that leaks, as indicated by an arrow B, through the cable boots 71 and 72 and a portion of the optical module to which the optical cable 60 is connected. The inventors have found out that the leak of the electromagnetic wave A can be reduced by sealing the gap between the upper housing 52 and the cage 83 with, for example, a gasket made of a metal.

Further, the inventors have found out that because the strength of the electromagnetic wave B is high, the adverse effect of electromagnetic waves generated in the optical module can be effectively reduced by reducing the leak of the electromagnetic wave B.

Figure 3:
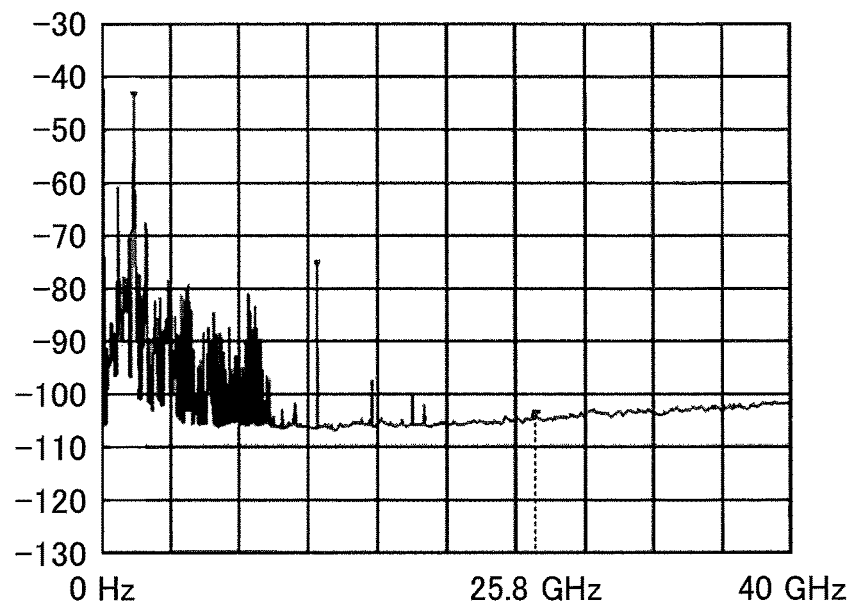
FIG. 3 is a graph illustrating frequency characteristics observed while an optical module is powered off.
Figure 4:
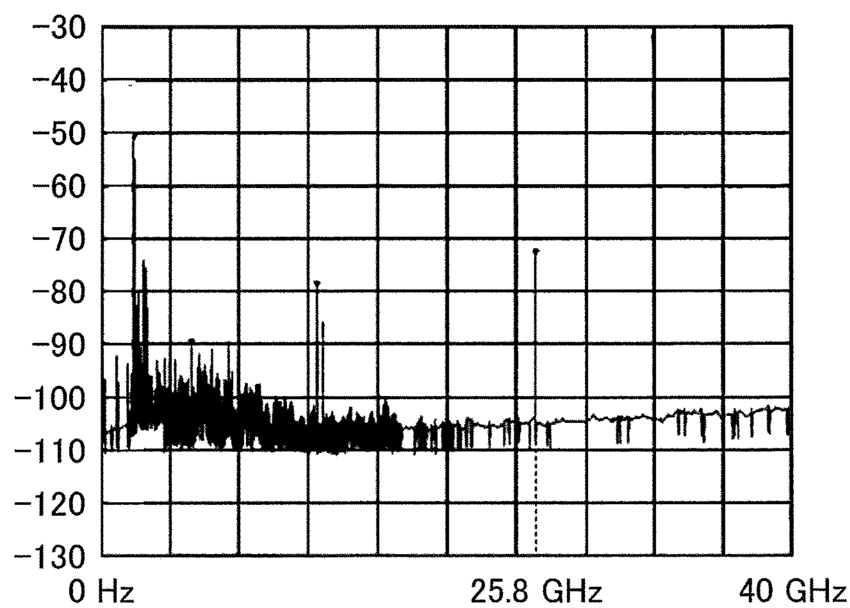

FIGS. 3 and 4 illustrate frequency characteristics that are obtained by measuring electromagnetic waves leaking from the optical module using an antenna disposed near an end of the optical module to which the optical cable 60 is connected. FIG. 3 illustrates frequency characteristics observed while the optical module is powered off, and FIG. 4 illustrates frequency characteristics observed while the optical module is powered on. Comparing FIGS. 3 and 4, when the optical module is powered on, noise is generated at a frequency of about 25.8 GHz. The strength of the electromagnetic wave with the frequency of about 25.8 GHz is −73.5 dBm. Here, the optical module uses a frequency of about 12.5 GHz.

Figure 5:
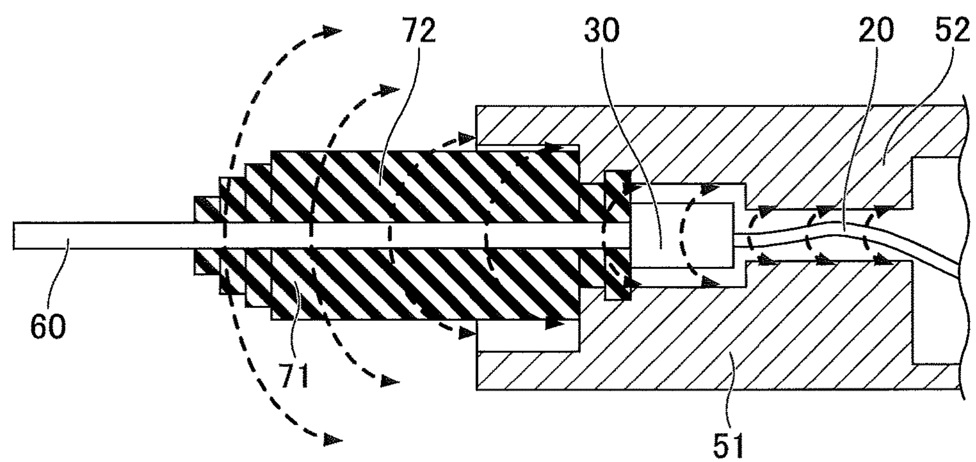
FIG. 5 is a drawing illustrating an electromagnetic wave being emitted from an optical module.

FIG. 5 illustrates a vertically-polarized electromagnetic wave that is emitted when the optical module is powered on. Arrows of broken lines indicate the directions of the electric field of the vertically-polarized electromagnetic wave. The present invention is based on the above-described findings of research conducted by the inventors.

First Embodiment

<Optical Module>

Figure 6A:
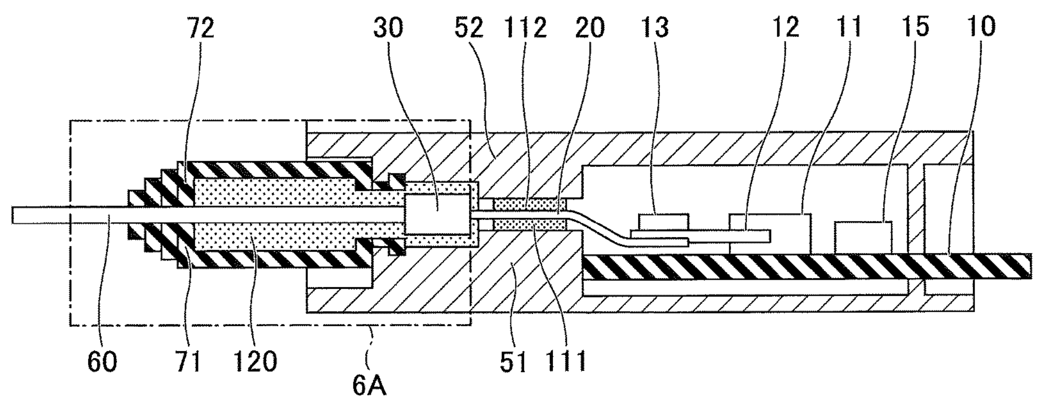
FIGS. 6A and 6B are drawings illustrating a configuration of an optical module according to a first embodiment.

Next, an optical module according to a first embodiment is described. FIG. 6A is a cross-sectional view of the optical module of the first embodiment, and FIG. 6B illustrates an area surrounded by a dashed-dotted line 6A in FIG. 6A.

Figure 6B:
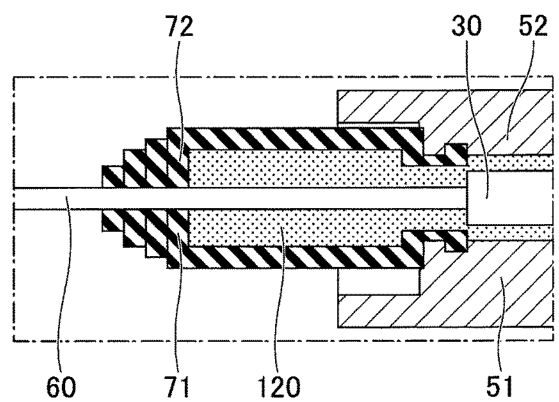

As illustrated in FIGS. 6A and 6B, the optical module includes a first conductive part 111 disposed between the lower housing 51 and the optical waveguide 20 and a second conductive part 112 disposed between the upper housing 52 and the optical waveguide 20. The optical waveguide 20 is sandwiched between the first conductive part 111 and the second conductive part 112. Also, a conductive part 120 is provided around a portion of the optical cable 60 in the cable boots 71 and 72. As illustrated in FIGS. 6A and 6B, the conductive part 120 may be formed to also cover the optical connector 30 outside of the cable boots 71 and 72.

The first conductive part 111 and the second conductive part 112 are formed of an elastic conductive material. The conductive part 120 is formed of a conductive material or preferably an elastic conductive material. Examples of materials for the first conductive part 111 and the second conductive part 112 include conductive sponge and conductive rubber. Examples of materials for the conductive part 120 include conductive mesh and conductive sponge. The first conductive part 111, the second conductive part 112, and the conductive part 120 have elasticity and are deformed to closely contact the optical wave guide 20 and the optical cable 60.

In the optical module of the first embodiment, the first conductive part 111 is in contact with the lower housing 51, and the second conductive part 112 is in contact with the upper housing 52.

Electromagnetic waves are generated by, for example, wires (not shown) formed on the board 10 and the FPC 12, the light-emitting element 13, and the driving IC 15 inside of the optical module. Accordingly, providing the first conductive part 111 and the second conductive part 112 between the lower housing 51 and the upper housing 52 in a region where the optical wave guide 20 is disposed makes it possible to absorb and block a large portion of the electromagnetic wave propagating through a space between the lower housing 51 and the upper housing 52, and prevent the electromagnetic wave from leaking out of the optical module. Because the optical wave guide 20 is present between the first conductive part 111 and the second conductive part 112, a portion of the electromagnetic wave leaking through the optical waveguide 20 cannot be blocked. However, because the optical waveguide 20 is very thin, the portion of the electromagnetic wave leaking through the optical waveguide 20 and becoming noise is very small. That is, when the optical waveguide 20 is thin, the cross-sectional area of the optical waveguide 20, which is orthogonal to the direction in which the electromagnetic wave is emitted from a noise source, becomes small, and a large portion of the electromagnetic wave is absorbed by the first conductive part 111 and the second conductive part 112.

The optical module of the first embodiment also includes the conductive part 120 disposed around a portion of the optical cable 60 in the cable boots 71 and 72. The conductive part 120 can absorb and block a large portion of the electromagnetic wave leaking through the optical waveguide 20. Because the optical cable 60 is present in the cable boots 71 and 72, a portion of the electromagnetic wave leaking through the optical cable 60 cannot be blocked. However, because the optical cable 60 is relatively thin, the portion of the electromagnetic wave leaking through the optical cable 60 and becoming noise is very small. That is, when the optical cable 60 is thin, the cross-sectional area of the optical cable 60, which is orthogonal to the direction in which the electromagnetic wave is emitted from a noise source, becomes small, and a large portion of the electromagnetic wave is absorbed by the conductive part 120.

Figure 7:
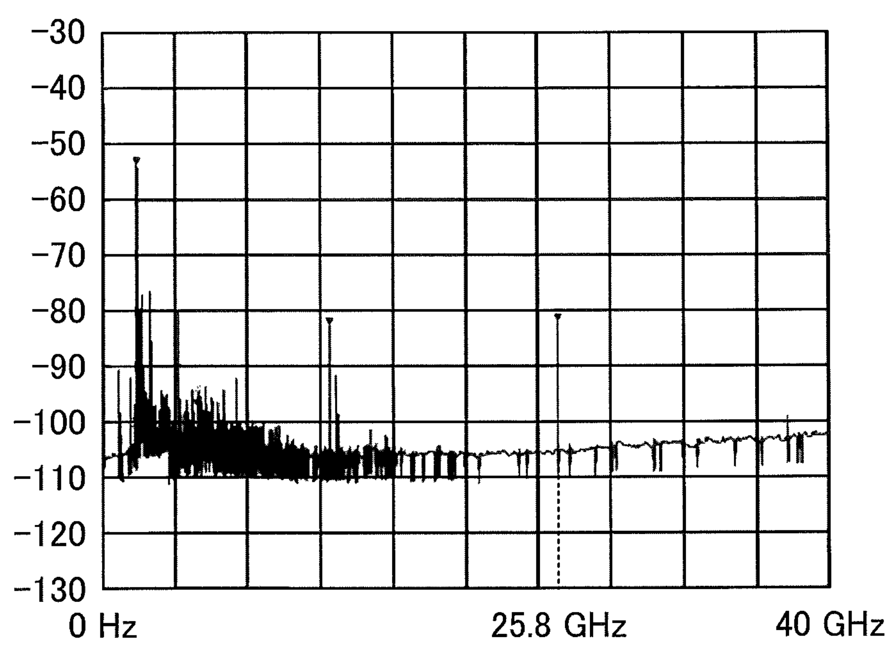

Next, an effect of the optical module of the first embodiment is described. FIG. 7 illustrates frequency characteristics of electromagnetic waves emitted from the optical module including the first conductive part 111, the second conductive part 112, and the conductive part 120 while the optical module is powered on. As illustrated in FIG. 7, with the optical module of the first embodiment, the strength of the electromagnetic wave with a frequency of 25.8 GHz is −82.0 dBm. In contrast, as illustrated in FIG. 4, in the case of the optical module that does not include the first conductive part 111, the second conductive part 112, and the conductive part 120, the strength of the electromagnetic wave having a frequency of 25.8 GHz, which is emitted while the optical module is powered on, is −73.5 dBm. Thus, the first embodiment can reduce the strength of a noise electromagnetic wave by about 8.5 dBm.

The optical module of the first embodiment described above includes both the first and second conductive parts 111 and 112 and the conductive part 120. However, the optical module of the first embodiment may be configured to include only the first and second conductive parts 111 and 112 or the conductive part 120.

Figure 8A:
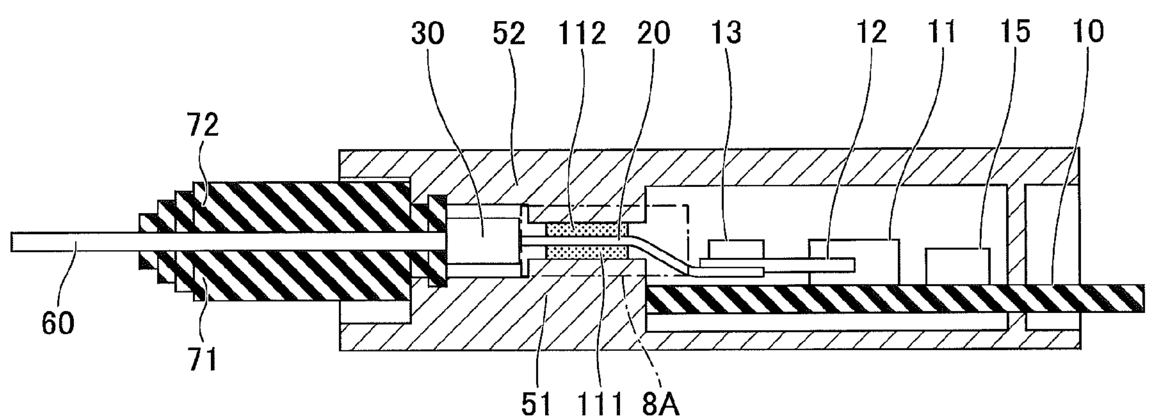
FIGS. 8A and 8B are drawings illustrating a configuration of another optical module according to the first embodiment.
Figure 8B:
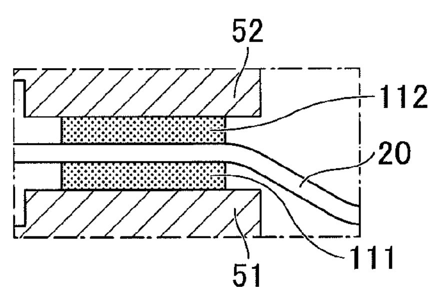
Figure 9A:
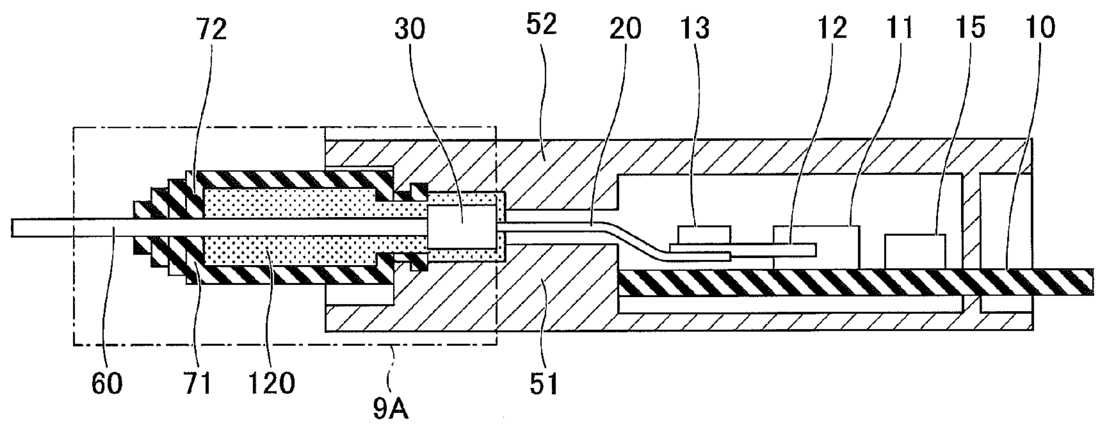
FIGS. 9A and 9B are drawings illustrating a configuration of another optical module according to the first embodiment.
Figure 9B:
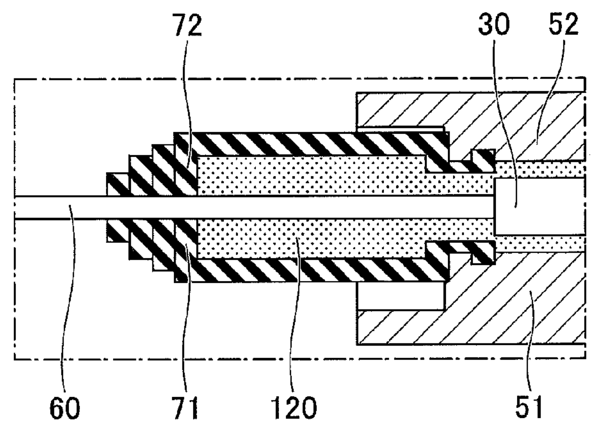

As illustrated in FIGS. 8A and 8B, an optical module of the first embodiment may be configured to include the first and second conductive parts 111 and 112 and not include the conductive part 120. Also, as illustrated in FIGS. 9A and 9B, an optical module of the first embodiment may be configured to include the conductive part 120 and not include the first and second conductive parts 111 and 112. The conductive part 120 may be formed not only inside of the cable boots 71 and 72, but also inside of the housing such that the conductive part 120 is in contact with the lower housing 51 and the upper housing 52. FIG. 8A is a cross-sectional view of the optical module including the first conductive part 111 and the second conductive part 112, and FIG. 8B illustrates an area surrounded by a dashed-dotted line 8A in FIG. 8A. FIG. 9A is a cross-sectional view of the optical module including the conductive part 120, and FIG. 9B illustrates an area surrounded by a dashed-dotted line 9A in FIG. 9A.

Figure 10A:
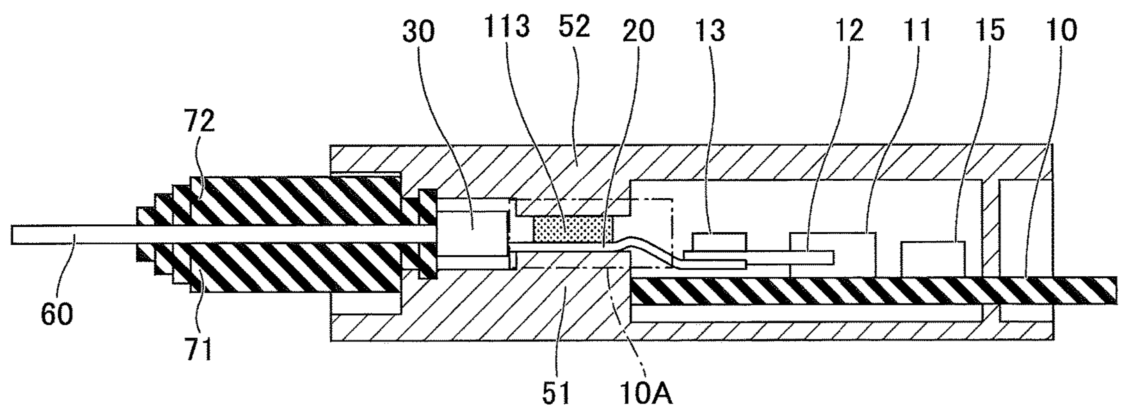
FIGS. 10A and 10B are drawings illustrating a configuration of another optical module according to the first embodiment.
Figure 10B:
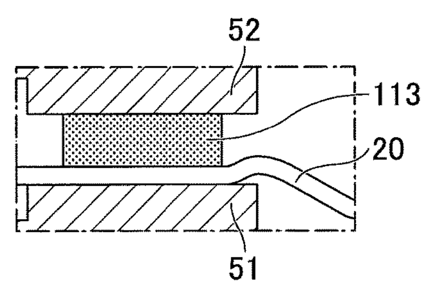

An optical module may include a conductive part different from the first conductive part 111 and the second conductive part 112 illustrated in FIGS. 6A and 6B and FIGS. 8A and 8B. For example, as illustrated in FIG. 10, an optical module may include a conductive part 113 disposed between the upper housing 52 and the optical waveguide 20. FIG. 10A is a cross-sectional view of the optical module including the conductive part 113, and FIG. 10B illustrates an area surrounded by a dashed-dotted line 10A in FIG. 10A. The conductive part 113 is in contact with the upper housing 52, and the optical waveguide 20 is sandwiched between the conductive part 113 and the lower housing 51. The configuration of FIGS. 10A and 10B can reduce the emission of a noise electromagnetic wave at a level similar to that of the configuration of FIGS. 8A and 8B.

Figure 11A:
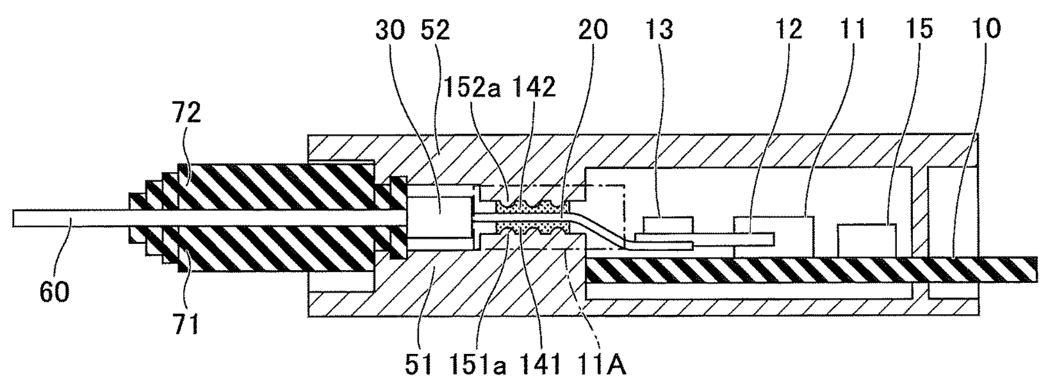
FIGS. 11A and 11B are drawings illustrating a configuration of another optical module according to the first embodiment.
Figure 11B:
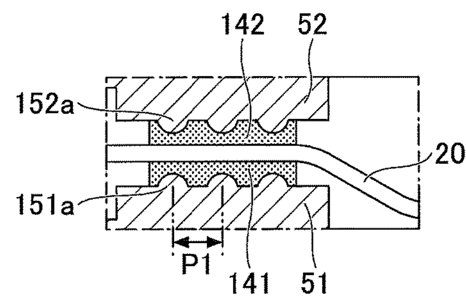
Figure 12A:
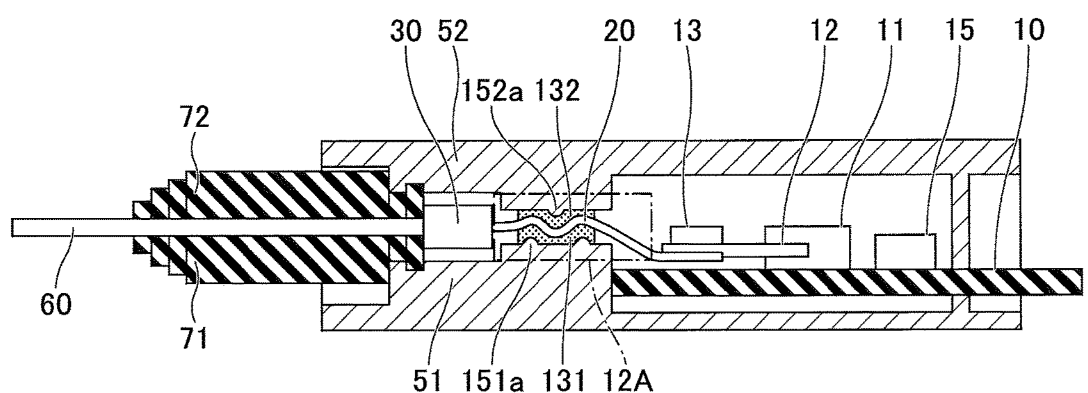
FIGS. 12A and 12B are drawings illustrating a configuration of another optical module according to the first embodiment.
Figure 12B:
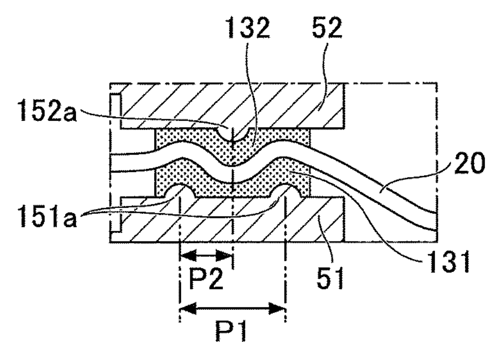

As illustrated in FIGS. 11A through 12B, protrusions may be formed on the inner surfaces of the lower housing 51 and the upper housing 52. FIG. 11A is a cross-sectional view of an optical module including protrusions, and FIG. 11B illustrates an area surrounded by a dashed-dotted line 11A in FIG. 11A. FIG. 12A is a cross-sectional view of another optical module including protrusions, and FIG. 12B illustrates an area surrounded by a dashed-dotted line 12A in FIG. 12A.

In the optical module of FIGS. 11A and 11B, multiple protrusions 151*a* are formed on the inner surface of the lower housing 51, and multiple protrusions 152*a* are formed on the inner surface of the upper housing 52. A pitch P1 between the protrusions 151*a* and between the protrusions 152*a* is set at a value less than or equal to λ/4 where λ indicates the wavelength of a noise electromagnetic wave. A first conductive part 141 and a second conductive part 142 are provided on the corresponding sides of the optical waveguide 20. The lower housing 51 and the upper housing 52 are formed of a metal and have conductivity higher than the conductivity of the first conductive part 141 and the second conductive part 142. Therefore, the emission of a noise electromagnetic wave from the optical module can be effectively reduced by arranging the protrusions 151*a* on the inner surface of the lower housing 51 at the pitch P1 of less than or equal to λ/4 and arranging the protrusions 152*a* on the inner surface of the upper housing 52 at the pitch P1 of less than or equal to λ/4. For example, when the frequency of a noise electromagnetic wave is 25.8 GHz, λ/4 is 2.9 mm and the pitch P1 is set at less than or equal to 2.9 mm. The height of the protrusions 151*a* and the protrusions 152*a* may be, for example, about 2 mm.

In the optical module of FIGS. 12A and 12B, protrusions 151*a* are formed such that a pitch P1 between the apexes of the protrusions 151*a* becomes less than or equal to λ/2, and a protrusion 152*a* is formed such that the apex of the protrusion 152*a* is positioned in the middle between adjacent protrusions 151*a*. Also, a first conductive part 131 and a second conductive part 132 are provided on the corresponding sides of the optical waveguide 20. In this case, a pitch P2 between the apex of each protrusion 151*a* and the apex of the protrusion 152*a* becomes less than or equal to λ/4. Therefore, similarly to the configuration of FIGS. 11A and 11B, the configuration of FIGS. 12A and 12B can reduce the emission of a noise electromagnetic wave from the optical module.

Figure 13A:
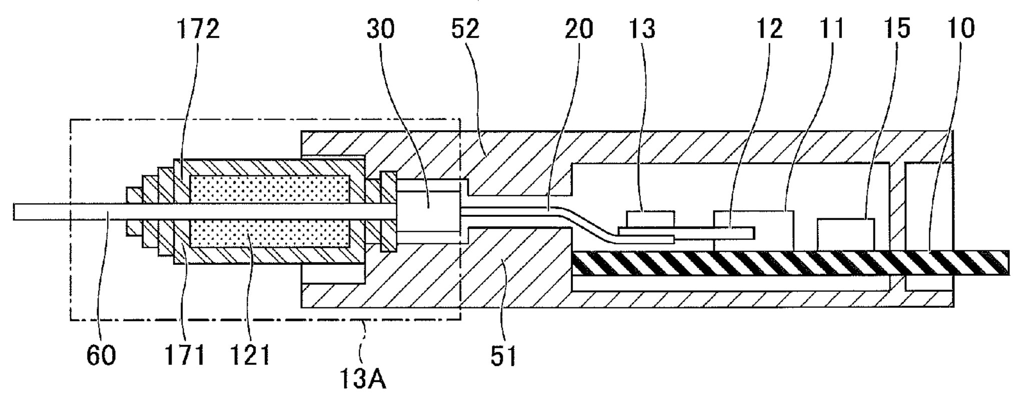
FIGS. 13A and 13B are drawings illustrating a configuration of another optical module according to the first embodiment.
Figure 13B:
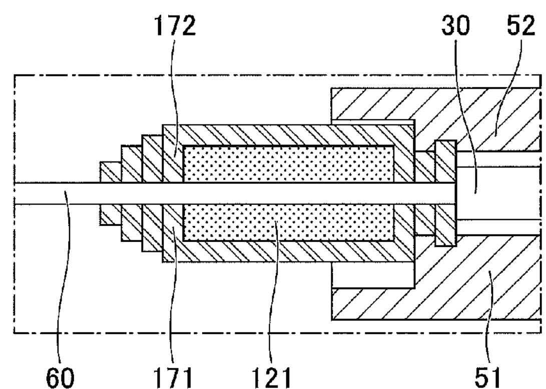

Also, as illustrated in FIGS. 13A and 13B, cable boots 171 and 172 may be formed of an elastic conductive material such as conductive rubber, and a conductive part 121 made of, for example, conductive sponge may be formed around a portion of the optical cable 60 in the cable boots 171 and 172. FIG. 13A is a cross-sectional view of an optical module including the cable boots 171 and 172, and FIG. 13B illustrates an area surrounded by a dashed-dotted line 13A in FIG. 13A.

For the optical modules of the first embodiment, a radio absorbing material may be used in place of a conductive material and an elastic conductive material. Examples of radio absorbing materials include conductive radio absorbing materials such as a fabric made by weaving conductive fibers and a dielectric sheet on which indium oxide tin is deposited; a dielectric radio absorbing material made of, for example, polyethylene foam or rubber containing carbon particles; and magnetic radio absorbing materials such as iron, nickel, and ferrite.

Second Embodiment

Figure 14A:
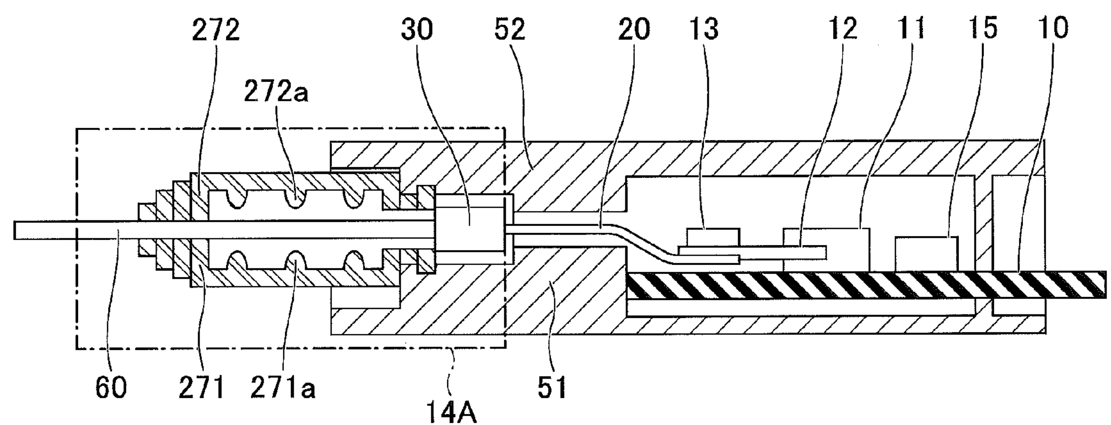
FIGS. 14A and 14B are drawings illustrating a configuration of an optical module according to a second embodiment.
Figure 14B:
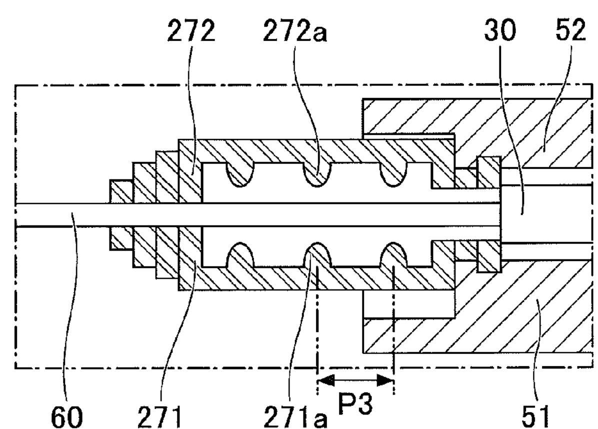

Next, a second embodiment is described. FIG. 14A is a cross-sectional view of an optical module of the second embodiment, and FIG. 14B illustrates an area surrounded by a dashed-dotted line 14A in FIG. 14A. The optical module of the second embodiment has a configuration where multiple protrusions are formed on the inner surfaces of cable boots.

The optical module of FIGS. 14A and 14B includes cables boots 271 and 272 formed of a conductive material or a radio absorbing material. Multiple protrusions 271*a* protruding toward the optical cable 60 are formed on the inner surface of the cable boot 271, and multiple protrusions 272*a* protruding toward the optical cable 60 are formed on the inner surface of the cable boot 272.

A pitch P3 between the protrusions 271*a* and between the protrusions 272*a* is set at a value less than or equal to λ/4 where λ indicates the wavelength of a noise electromagnetic wave. The cable boots 271 and 272 are formed of, for example, conductive rubber and are in contact with the housing. Similarly to the first embodiment, setting the pitch P3 between the protrusions at a value less than or equal to λ/4 makes it possible to reduce the leakage of a noise electromagnetic wave.

Figure 15A:
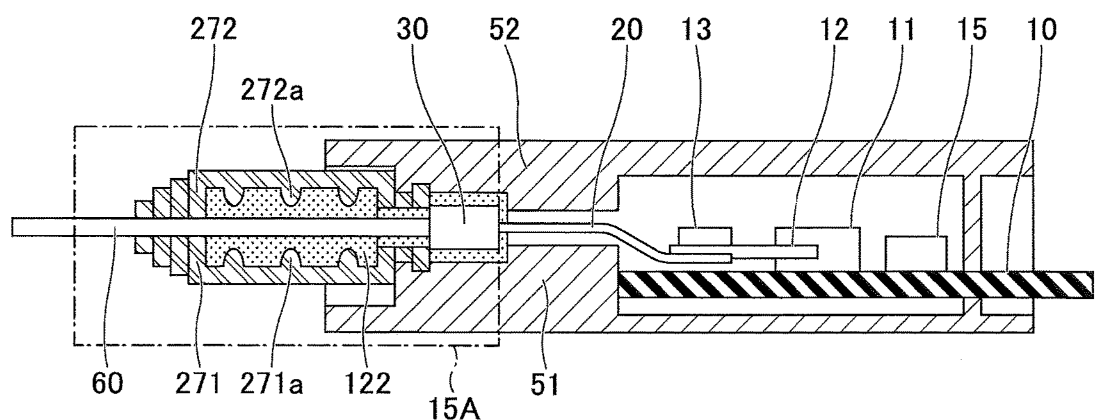
FIGS. 15A and 15B are drawings illustrating a configuration of another optical module according to the second embodiment.
Figure 15B:
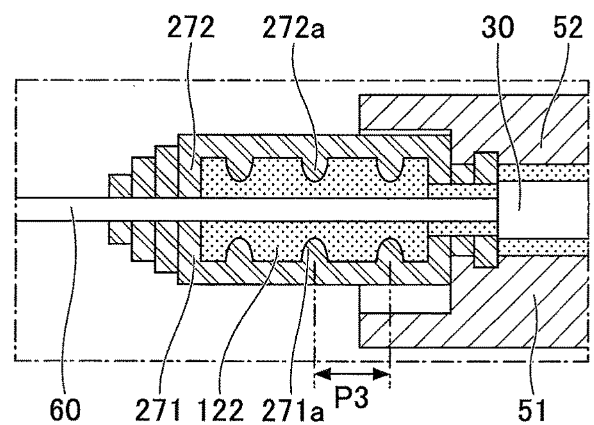

As illustrated in FIGS. 15A and 15B, the optical module of the second embodiment may also include a conductive part 122 filling the inside of the cable boots 271 and 272. FIG. 15A is a cross-sectional view of the optical module including the conductive part 122, and FIG. 15B illustrates an area surrounded by a dashed-dotted line 15A in FIG. 15A.

Figure 16A:
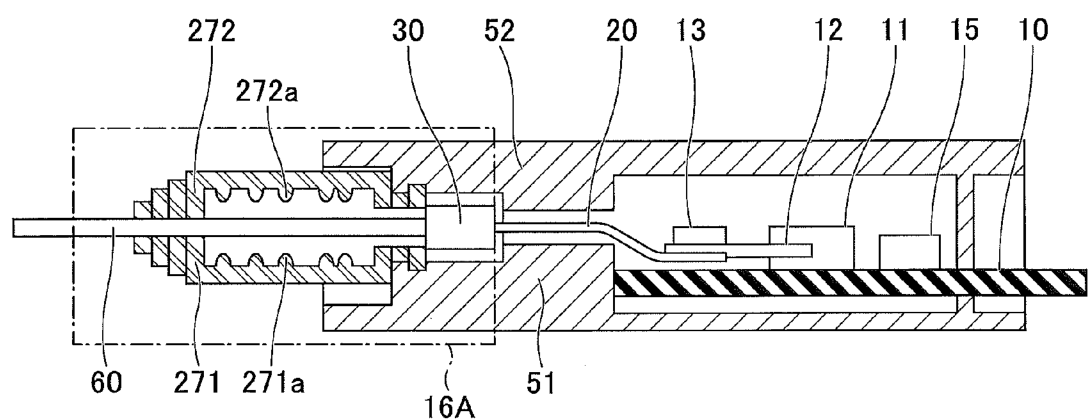
FIGS. 16A and 16B are drawings illustrating a configuration of another optical module according to the second embodiment.
Figure 16B:
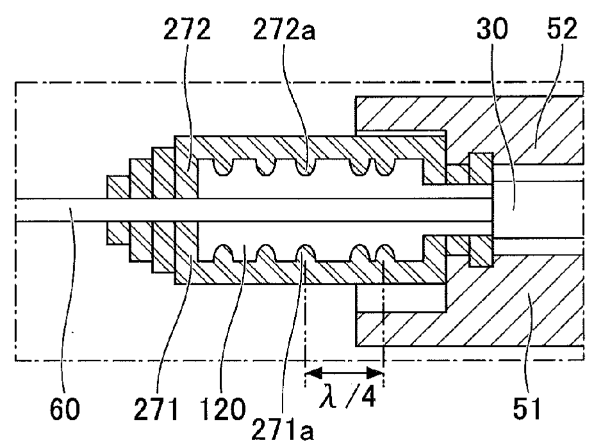

Also, as illustrated in FIGS. 16A and 16B, the pitch between the protrusions 271*a* and between the protrusions 272*a* may be varied. FIG. 16A is a cross-sectional view of an optical module where the protrusions are arranged at various pitches, and FIG. 16B illustrates an area surrounded by a dashed-dotted line 16A in FIG. 16A. Arranging the protrusions 271*a* and the protrusions 272*a* at pitches corresponding to the frequencies of noise electromagnetic waves makes it possible to reduce the leakage of electromagnetic waves with different frequencies.

Figure 17A:
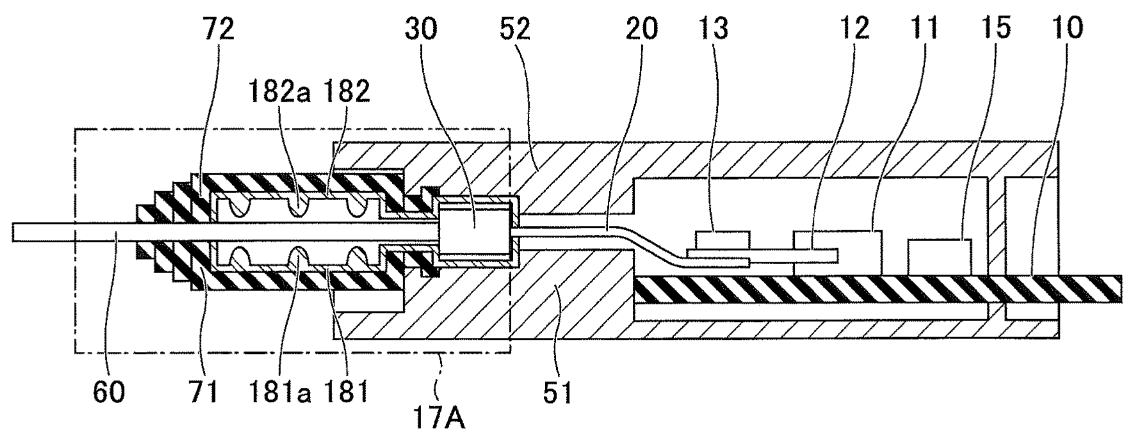
FIGS. 17A and 17B are drawings illustrating a configuration of another optical module according to the second embodiment.
Figure 17B:
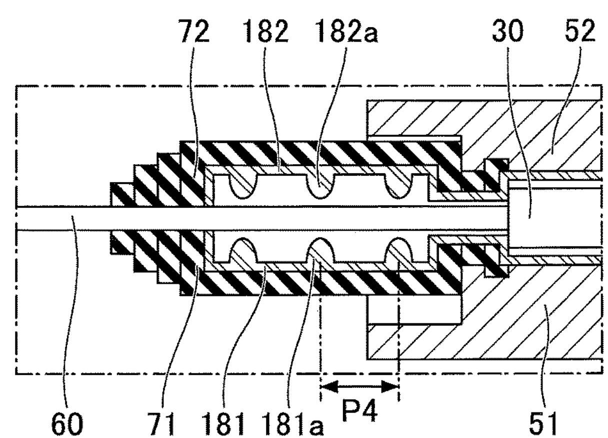

Also, as illustrated in FIGS. 17A and 17B, an optical module of the second embodiment may include a conductive part 181 that is formed with a conductive material on the inner surface of the cable boot 71 and includes multiple protrusions 181*a*, and a conductive part 182 that is formed with a conductive material on the inner surface of the cable boot 72 and includes multiple protrusions 182*a*. FIG. 17A is a cross-sectional view of the optical module, and FIG. 17B illustrates an area surrounded by a dashed-dotted line 17A in FIG. 17A. The conductive part 181 is in contact with and electrically connected to the lower housing 51, and the conductive part 182 is in contact with and electrically connected to the upper housing 52. A pitch P4 between the protrusions 181*a* and between the protrusions 182*a* is set at a value less than or equal to λ/4 where λ indicates the wavelength of a noise electromagnetic wave. The conductive part 181 and the conductive part 182 are formed with a material such as metal foil, a conductive sheet, or conductive gel by applying or pasting the material to the inner surfaces of the cable boot 71 and the cable boot 72. Similarly to the first embodiment, setting the pitch P4 between the protrusions at a value less than or equal to λ/4 makes it possible to reduce the leakage of a noise electromagnetic wave.

For the optical modules of the second embodiment, a radio absorbing material may be used in place of a conductive material. Radio absorbing materials usable for the optical modules of the second embodiment are the same as those described in the first embodiment.

Other components and configurations of the optical modules of the second embodiment are substantially the same as those described in the first embodiment.

Third Embodiment

Figure 18A:
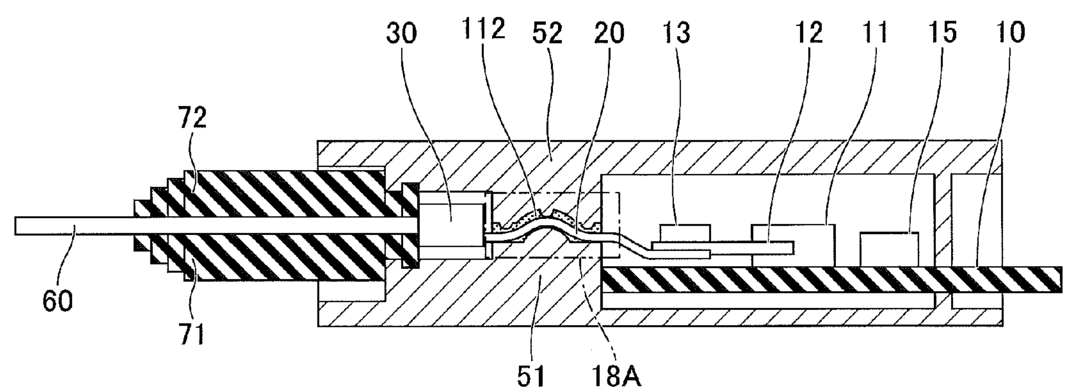
FIGS. 18A and 18B are drawings illustrating a configuration of an optical module according to a third embodiment.
Figure 18B:
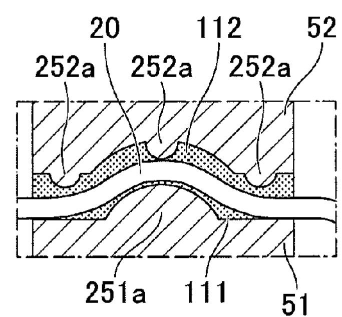

Next, an optical module according to a third embodiment is described. FIG. 18A is a cross-sectional view of the optical module of the third embodiment, and FIG. 18B illustrates an area surrounded by a dashed-dotted line 18A in FIG. 18A. In the optical module of the third embodiment, a convex part 251*a* with a curved surface is formed on the inner surface of the lower housing 51. The convex part 251*a* is preferably formed such that noise from a noise source is blocked at a position between the lower housing 51 and the upper housing 52. The inner surface of the upper housing 52 has a recess with a concave shape that corresponds to the shape of the convex part 251*a* of the lower housing 51. The convex part 251*a* can block an emitted electromagnetic wave and reduce a vertically polarized wave. Also, multiple protrusions 252*a* arranged at a pitch of less than or equal to λ/4 may be formed on the inner surface of the upper housing 52.

Figure 19A:
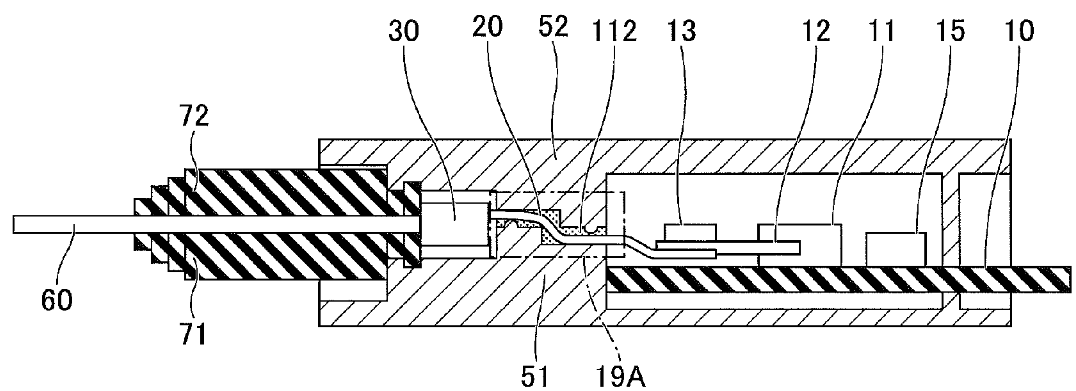
FIGS. 19A and 19B are drawings illustrating a configuration of another optical module according to the third embodiment.
Figure 19B:
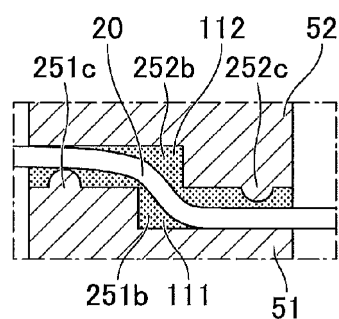

FIG. 19A is a cross-sectional view of an optical module including cranks, and FIG. 19B illustrates an area surrounded by a dashed-dotted line 19A in FIG. 19A. In the optical module of FIGS. 19A and 19B, a crank 251*b* is formed in the inner surface of the lower housing 51 and a crank 252*b* is formed in the inner surface of the upper housing 52 such that a crank-shaped space is formed between the inner surfaces of the lower housing 51 and the upper housing 52. The crank 251*b* of the lower housing 51 and the crank 252*b* of the upper housing 52 are preferably formed such that noise from a noise source is blocked at a position between the lower housing 51 and the upper housing 52. The crank shape formed by the crank 251*b* and the crank 252*b* can block an emitted electromagnetic wave and reduce a vertically polarized wave. Also, a protrusion 251*c* may be formed on the inner surface of the lower housing 51 and a protrusion 252*c* may be formed on the inner surface of the upper housing 52. In the third embodiment, similarly to the first embodiment, the first conductive part 111 and the second conductive part 112 are provided on the corresponding sides of the optical waveguide 20.

Other components and configurations of the optical modules of the third embodiment are substantially the same as those described in the first embodiment.

Fourth Embodiment

Figure 20A:
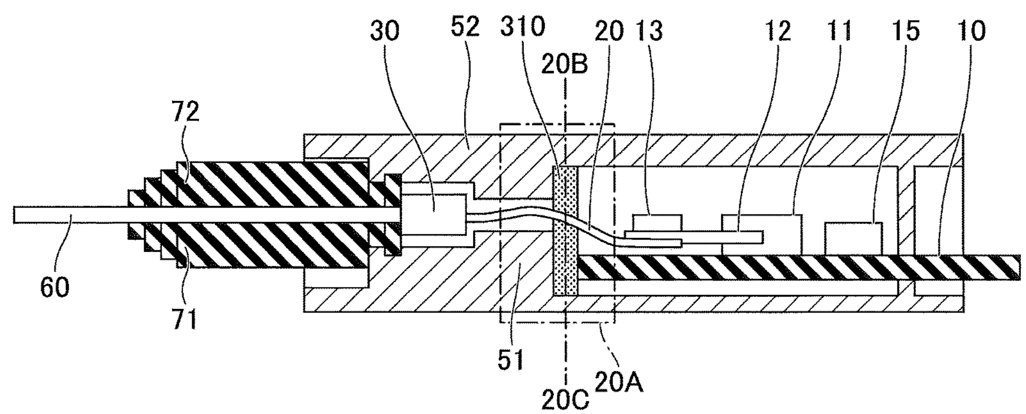
FIGS. 20A through 20C are drawings illustrating a configuration of an optical module according to a fourth embodiment.
Figure 20B:
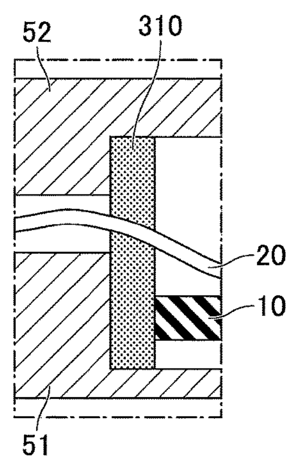
Figure 20C:
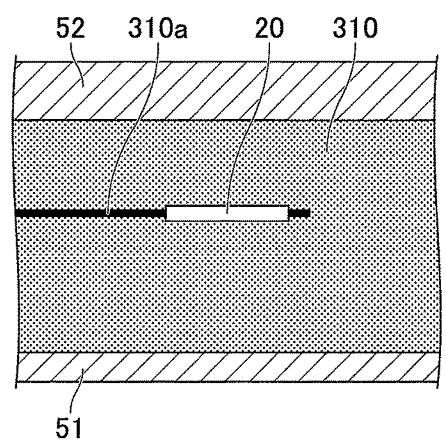

Next, an optical module according to a fourth embodiment is described. FIG. 20A is a cross-sectional view of the optical module of the fourth embodiment, FIG. 20B illustrates an area surrounded by a dashed-dotted line 20A in FIG. 20A, and FIG. 20C is a cross-sectional view taken along a dashed-dotted line 20B-20C in FIG. 20A. As illustrated in FIGS. 20A through 20C, the optical module of the fourth embodiment includes a conductive part 310 disposed in a wide space between the lower housing 51 and the upper housing 52 at a position close to the board 10. The conductive part 310 is formed of, for example, conductive sponge or a copper tape. A slit 310*a* is formed beforehand in the conductive part 310 so that the optical waveguide 20 can be inserted into the slit 310*a*. The conductive part 310 can be more easily placed in a wider space than in a narrower space between the lower housing 51 and the upper housing 52.

Figure 21:
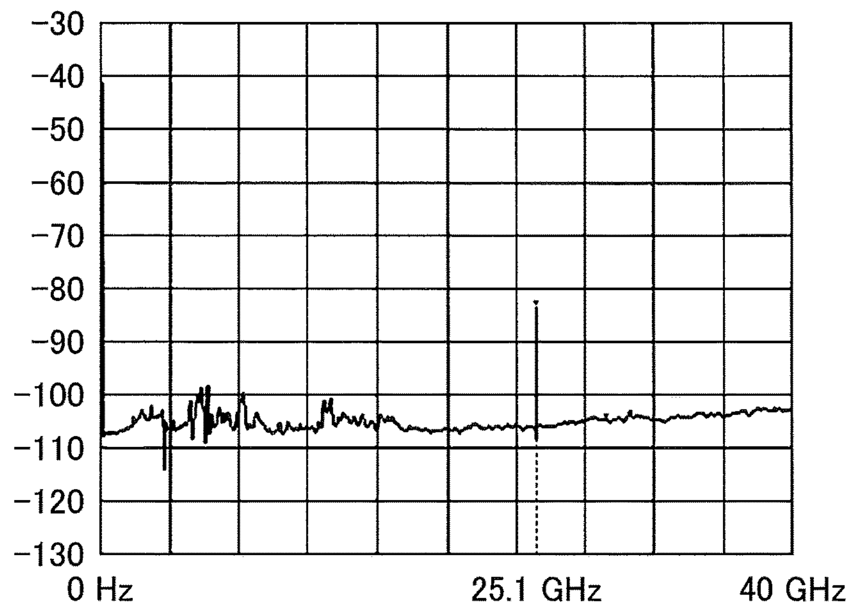
Figure 22:
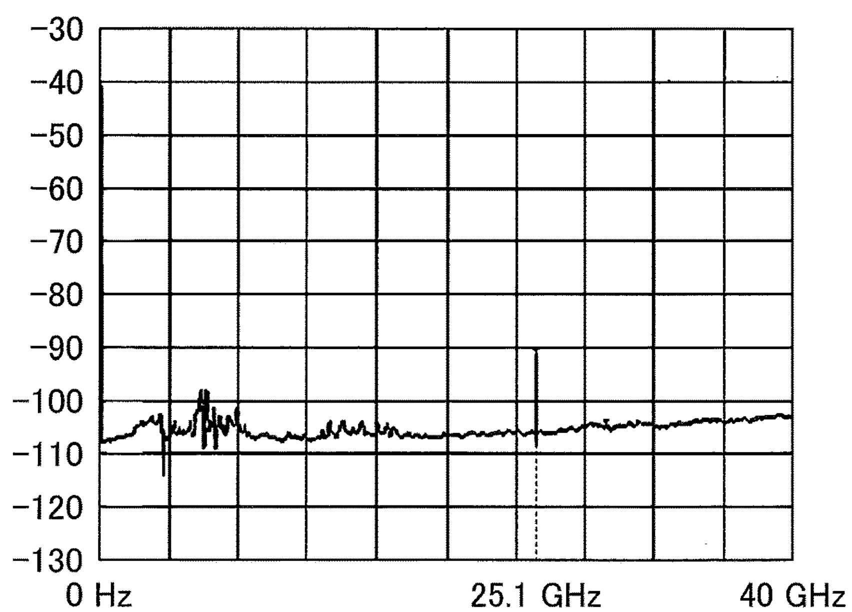

FIG. 21 is a graph illustrating frequency characteristics of electromagnetic waves emitted when an optical module that does not include the conductive part 310 is powered on. FIG. 22 is a graph illustrating frequency characteristics of electromagnetic waves emitted when the optical module of the fourth embodiment including the conductive part 310 is powered on. As illustrated in FIG. 21, in the case of the optical module that does not include the conductive part 310, the strength of the electromagnetic wave with a frequency of 25.1 GHz is −83.5 dBm. As illustrated in FIG. 22, in the case of the optical module including the conductive part 310, the strength of the electromagnetic wave with a frequency of 25.1 GHz is −91.2 dBm. Thus, the fourth embodiment can reduce the strength of an electromagnetic wave emitted from an optical module by about 7.7 dBm.

Figure 23A:
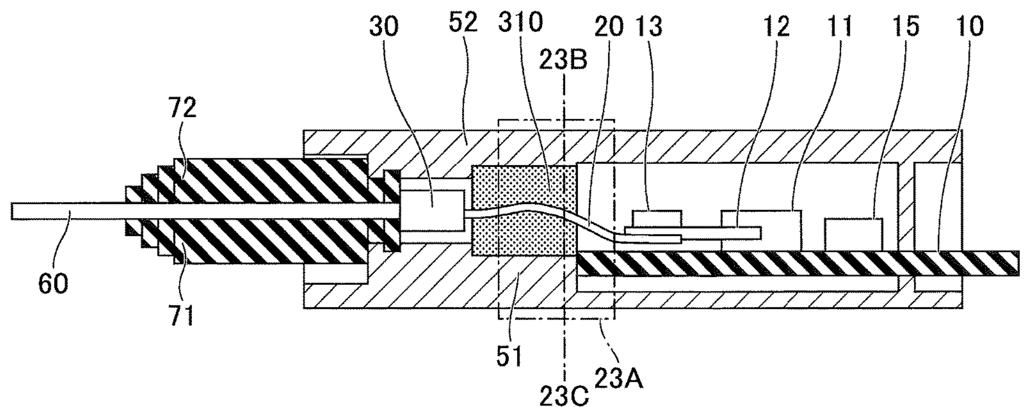
FIGS. 23A through 23C are drawings illustrating a configuration of another optical module according to the fourth embodiment.
Figure 23B:
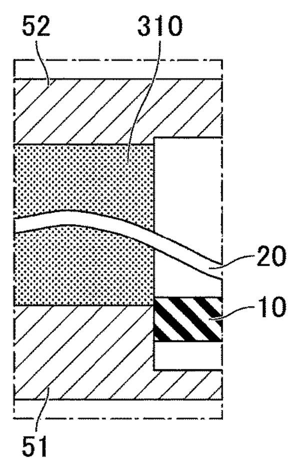
Figure 23C:
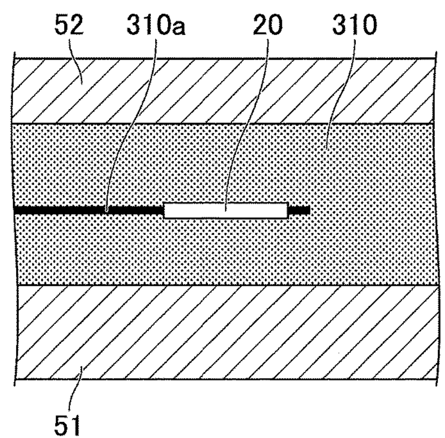

As illustrated in FIGS. 23A through 23C, another optical module of the fourth embodiment may be configured such that a space between the lower housing 51 and the upper housing 52 is widened and the conductive part 310 is placed in the widened space. FIG. 23A is a cross-sectional view of the optical module, FIG. 23B illustrates an area surrounded by a dashed-dotted line 23A in FIG. 23A, and FIG. 23C is a cross-sectional view taken along a dashed-dotted line 23B-23C in FIG. 23A.

Other components and configurations of the optical modules of the fourth embodiment are substantially the same as those described in the first embodiment.

An aspect of this disclosure provides an optical module configured to reduce the strength of an electromagnetic wave leaked from the optical module.

Optical modules according to embodiments of the present invention are described above. However, the present invention is not limited to the specifically disclosed embodiments, and variations and modifications may be made without departing from the scope of the present invention.

What is claimed is:

1. An optical module, comprising:
- a board;
- a photoelectric transducer disposed on the board;
- an optical waveguide that is connected to the board and transmits light entering or emitted from the photoelectric transducer;
- an optical connector including a first end connected to the optical waveguide and a second end to be connected to an optical cable;
- a housing that houses the board, the photoelectric transducer, the optical waveguide, and the optical connector; and
- a conductive part that is provided between the optical waveguide and the housing, in contact with the housing, and formed of an elastic conductive material or a radio absorbing material.

2. The optical module as claimed in claim 1, wherein the conductive part is provided between a first surface of the optical waveguide and the housing and between a second surface of the optical waveguide and the housing.

3. The optical module as claimed in claim 1, further comprising:
- multiple protrusions formed on a surface of the housing that is in contact with the conductive part,
- wherein the protrusions are arranged at a pitch of less than or equal to $\lambda/4$ where $\lambda$ indicates a wavelength of an electromagnetic wave emitted out of the housing.

4. An optical module, comprising:
- a board;
- a photoelectric transducer disposed on the board;
- an optical waveguide that is connected to the board and transmits light entering or emitted from the photoelectric transducer;
- an optical connector connected to the optical waveguide;
- an optical cable connected to the optical connector;
- a housing that houses the board, the photoelectric transducer, the optical waveguide, and the optical connector;
- a cable boot that is connected to the housing and covers the optical cable; and
- a conductive part that is disposed between the cable boot and the optical cable, and formed of a conductive material or a radio absorbing material.

5. The optical module as claimed in claim 4, wherein the conductive part includes multiple protrusions that protrude toward the optical cable.

6. The optical module as claimed in claim 4, wherein the conductive part is electrically connected to the housing.

7. An optical module, comprising:
- a board;
- a photoelectric transducer disposed on the board;
- an optical waveguide that is connected to the board and transmits light entering or emitted from the photoelectric transducer;
- an optical connector connected to the optical waveguide;
- an optical cable connected to the optical connector;
- a housing that houses the board, the photoelectric transducer, the optical waveguide, and the optical connector;
- a cable boot that is connected to the housing, covers the optical cable, and is formed of a conductive material or a radio absorbing material; and
- multiple protrusions formed on an inner surface of the cable boot.

8. The optical module as claimed in claim 7, wherein the protrusions are arranged at a pitch of less than or equal to $\lambda/4$ where $\lambda$ indicates a wavelength of an electromagnetic wave emitted out of the housing.

9. The optical module as claimed in claim 8, wherein the protrusions are arranged at various pitches.

* * * * *